May 13, 1958     F. C. HUTTO     2,834,643

TOP-GROOVED OIL RING GROOVE

Filed Nov. 29, 1954

INVENTOR.
F.C. HUTTO.
BY E.C. McRae
J.R. Faulkner
T.H. Oster
ATTORNEYS

United States Patent Office 2,834,643
Patented May 13, 1958

2,834,643

TOP-GROOVED OIL RING GROOVE

Frank C. Hutto, Dearborn, Mich., assignor to Ford Motor Company, Dearborn, Mich., a corporation of Delaware Application November 29, 1954, Serial No. 471,784

5 Claims. (Cl. 309—8)

This invention is concerned with an improvement in internal combustion engines and more particularly with an improved piston designed to prevent excessive oil use while permitting adequate lubrication of the piston and cylinder wall.

Pistons in internal combustion engines have routinely been provided with both compression rings and oil control rings in an effort to minimize the leakage of operating fluids past the piston and to prevent the loss of crankcase oil into the combustion chamber. Conventionally, the oil control function has been assigned to that piston ring most remote from the combustion zone, the other rings being primarily compression retaining rings. To meet the ever-increasing demands for effective oil control, the art has resorted to many complicated and effective techniques in so far as the rings per se are concerned. The instant invention has been evolved in an effort to obtain satisfactory oil control without resort to complicated piston ring structures.

Figure 1:
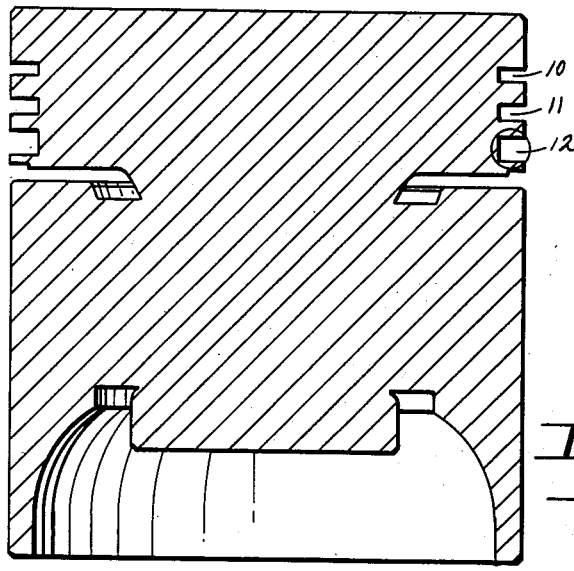
Figure 2:
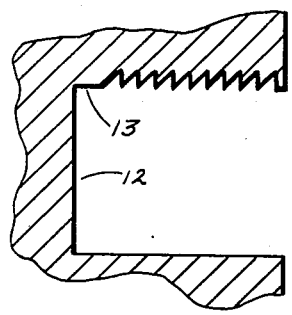
Figure 3:
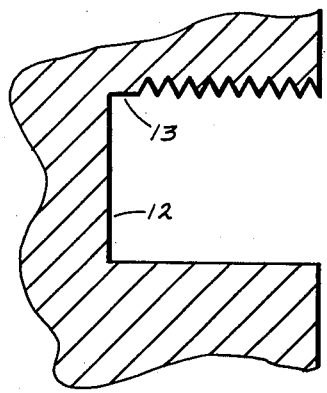
Figure 4:
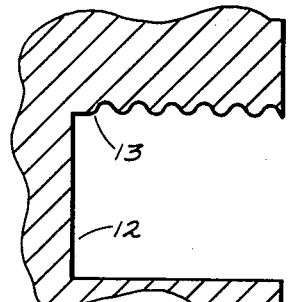

The substance of this invention is probably best understood by reference to the figures of the drawing in which, Figure 1 is a vertical cross section of a conventional automotive piston, and, Figure 2 is a vertical cross section of the area encircled in Figure 1 showing one species of the invention, and, Figure 3 is a similar cross section of the circled portion of Figure 1 showing a second species of the invention, and, Figure 4 is a similar section of the circled area of Figure 1 showing still another species of the invention.

The piston shown in section in Figure 1 comprises compression ring grooves 10 and 11 and oil control ring groove 12. The balance of the structure of the piston is conventional and will not be further described here.

By means of this invention it is possible to secure improved oil control by providing the upper surface of oil control ring groove 12 with a controlled roughness. In the species of invention shown in Figure 2, this roughness is accomplished by providing a series of saw-tooth-shaped serrations, one edge of which is inclined at an angle of 45 degrees to the axis of the piston and the other of which is approximately parallel to the axis of the piston. The 45 degree angle side slopes simultaneously away from the combustion chamber and toward the axis of the cylinder. While the invention is not so limited, the height of the serrations is preferably about fifteen-thousandths of an inch. These serrations extend around the upper wall of the piston groove.

In the species of invention shown in Figure 3, the roughness is obtained by providing the upper surface of oil control ring groove 12 with serrations which are substantially V-shaped. Again, the preferred height is about fifteen thousandths of an inch.

An alternative form of the invention is shown in Figure 4 and comprises an undulating roughness on the upper surface of oil control ring groove 12 in which the surface section is approximately a sine wave devoid of any acute asperities.

In each case it will be noted that the lowermost extremities of the roughnesses provided in the upper surface of oil control ring groove 12 are at least as far removed from the piston top as the unroughened surface 13. This is to insure contact of the piston ring and the peaks or asperities of the controlled roughened surface.

The portion of the stroke of a four cycle engine in which most oil is lost to the combustion chamber is the intake portion of the cycle in which a substantial vacuum exists within the combustion chamber. During this portion of the cycle the piston is moving downward and the piston ring enclosed within oil control ring groove 12 is at the extreme upper position permitted by the limitations of the groove. Under these circumstances, the upper portion of the piston ring which is substantially planar, is in contact with the asperities or undulations provided in the upper portion of oil control ring groove 12 and makes a sealing contact there which tends to prevent the passage of oil past this ring. These asperities serve as in somewhat the same manner as a labyrinth seal and prevent the splashing action of a normal ring which tends to eject oil trapped in the ring groove into the space between the piston and the cylinder wall.

While it is difficult to assign a minimum roughness value to the critical surface, it is necessary that the undulations be peripheral in nature. Such undulations may be produced as by moving a single pointed tool radially against the revolving piston, or a multipoint tool may be inserted into the oil groove radially and then moved axially against the revolving piston to cut such undulations.

It will be understood that the invention is not to be limited to the exact construction shown and described, but that various changes and modifications may be made without departing from the spirit and scope of the invention, as defined in the appended claims.

I claim as my invention:

1. An internal combustion engine piston comprising compression ring grooves and an oil retaining ring groove, the radial surface of the oil retaining ring groove nearest the combustion chamber when assembled in an engine being provided with substantially peripheral undulations of a height sufficient to form with the oil ring a labyrinth seal to prevent loss of oil, said undulations being saw-tooth shaped in section with the portion of the saw-tooth making the larger angle with the axis of the piston sloping simultaneously away from the combustion chamber and toward the axis of the piston, the apices of said undulations being arranged to contact the adjacent surface of the oil retaining piston ring.

2. An internal combustion engine piston comprising compression ring grooves and an oil retaining ring groove, the radial surface of the oil retaining ring groove nearest the combustion chamber when assembled in an engine being provided with substantially peripheral undulations of a height sufficient to form with the oil ring a labyrinth seal to prevent loss of oil, said undulations being substantially V-shaped in section.

3. An internal combustion engine piston comprising compression ring grooves and an oil retaining ring groove, the radial surface of the oil retaining ring groove nearest the combustion chamber when assembled in an engine being provided with substantially peripheral undulations of a height sufficient to form with the oil ring a labyrinth seal to prevent loss of oil, said undulations being substantially sine wave shapes in section.

4. An internal combustion engine piston comprising compression ring grooves and an oil retaining groove, the radial surface of the oil retaining groove nearest the combustion chamber when assembled in an engine being provided with substantially peripheral serrations of a height sufficient to form with the oil ring a labyrinth seal to prevent loss of oil, the apices of said serrations being arranged to contact the adjacent surface of the oil retaining piston ring.

5. An internal combustion engine piston comprising compression ring grooves, and an oil retaining ring groove, the radial surface of the oil retaining ring groove nearest the combustion chamber when assembled in an engine being provided with substantially peripheral serrations about fifteen thousandths of an inch in amplitude to form with the oil ring a labyrinth seal to prevent loss of oil, the apices of said serrations being arranged to contact the adjacent surface of the oil retaining piston ring.

References Cited in the file of this patent

UNITED STATES PATENTS

| | | |
|---|---|---|
| 1,426,694 | Weidenfeller | Aug. 22, 1922 |
| 1,808,057 | Monteagle | June 2, 1931 |
| 2,042,820 | Bax | June 2, 1936 |
| 2,078,748 | Wenzel | Apr. 27, 1937 |

FOREIGN PATENTS

| | | |
|---|---|---|
| 527,143 | France | July 18, 1921 |